(12) United States Patent
Alexander, III et al.

(10) Patent No.: US 7,548,989 B2
(45) Date of Patent: Jun. 16, 2009

(54) METHOD AND SYSTEM FOR MAINTAINING CONSISTENCY DURING MULTI-THREADED PROCESSING OF LDIF DATA

(75) Inventors: William Preston Alexander, III, Austin, TX (US); Kean G Kuiper, Round Rock, TX (US); Christopher Michael Richardson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1427 days.

(21) Appl. No.: 10/611,144

(22) Filed: Jul. 1, 2003

(65) Prior Publication Data

US 2005/0015763 A1      Jan. 20, 2005

(51) Int. Cl.
    *G06F 12/00* (2006.01)
(52) U.S. Cl. .................. 709/232; 707/200; 707/201; 707/204; 709/230; 709/250
(58) Field of Classification Search ......... 707/100, 707/101, 102, 200, 201, 204, 205; 709/230, 709/232, 250
See application file for complete search history.

(56) References Cited

U.S. PATENT DOCUMENTS

| | | | |
|---|---|---|---|
| 4,658,351 A | 4/1987 | Teng ........................ 364/200 |
| 5,212,778 A | 5/1993 | Dally et al. ................. 395/400 |
| 5,430,850 A | 7/1995 | Papadopoulos et al. ..... 395/375 |
| 5,758,343 A | 5/1998 | Vigil et al. .................... 707/10 |
| 5,826,081 A | 10/1998 | Zolnowsky ................. 395/673 |
| 5,857,180 A | 1/1999 | Hallmark et al. .............. 707/2 |
| 6,108,689 A | 8/2000 | Fagen et al. ................ 709/206 |
| 6,182,120 B1 | 1/2001 | Beaulieu et al. ............ 709/207 |
| 6,212,542 B1 | 4/2001 | Kahle et al. ................ 709/102 |
| 6,336,135 B1 | 1/2002 | Niblett et al. .............. 709/215 |
| 6,338,078 B1 | 1/2002 | Chang et al. ............... 709/102 |
| 6,539,077 B1 | 3/2003 | Ranalli et al. ............. 379/67.1 |
| 6,539,379 B1 | 3/2003 | Vora et al. ..................... 707/6 |
| 7,373,348 B2 * | 5/2008 | Bell et al. ..................... 707/10 |
| 2002/0066051 A1 | 5/2002 | Hobson et al. ............... 714/16 |
| 2002/0129153 A1 | 9/2002 | Fleming .................... 709/230 |

(Continued)

FOREIGN PATENT DOCUMENTS

GB          2321544 A        7/1998

(Continued)

*Primary Examiner*—William C Vaughn, Jr.
*Assistant Examiner*—Scott Christensen
(74) *Attorney, Agent, or Firm*—Hamilton & Terrile, LLP; Stephen A. Terrile (57) ABSTRACT

A method, a system, an apparatus, and a computer program product are presented for loading LDIF ((Lightweight Directory Access Protocol (LDAP) Data Interchange Format) data into a directory. A single reader thread reads entries from an LDIF file; each entry is associated with a priority value, e.g., the priority value for an entry may be based on the number of delimiters in the distinguished name within the entry. Multiple loading threads concurrently add the entries into an LDAP directory in accordance with their associated priority values. The entries are added to the LDAP directory in an order of highest indicated priority to lowest indicated priority; entries that are associated with priority values that indicate equal priority are considered to be equivalent for the purposes of ordering the entries, so entries that have equal priority may be added to the LDAP directory in any order.

2 Claims, 4 Drawing Sheets

U.S. PATENT DOCUMENTS

2002/0188617 A1    12/2002  Smith et al. .................. 707/102
2003/0059004 A1*    3/2003  Jiang et al. ............... 379/88.17
2003/0061347 A1     3/2003  Borcham et al. ............ 709/225
2003/0191868 A1*   10/2003  Espino ....................... 709/328

FOREIGN PATENT DOCUMENTS

GB            2321546  A       7/1998

* cited by examiner

METHOD AND SYSTEM FOR MAINTAINING CONSISTENCY DURING MULTI-THREADED PROCESSING OF LDIF DATA

BACKGROUND OF THE INVENTION

1. Field of the Invention The present invention relates to an improved data processing system and, in particular, to a method and apparatus for database operations.

2. Description of Related Art

Lightweight Directory Access Protocol (LDAP) servers typically include in their distribution a utility program that reads directory entries that are specified in the LDAP Data Interchange Format (LDIF) and loads them into the server's directory. This utility program typically reads entries from an LDIF file sequentially and then adds them to the directory by passing them to the directory server via a network connection, after which the utility program waits for the completion of the current add operation before initiating the next add operation. Because adding an entry to a directory may involve significant amounts of data input/output, some directory servers are capable of handling LDAP addition operations from multiple client connections concurrently. More information about LDAP can be found in Wahl et al., "Lightweight Directory Access Protocol (v3)", RFC 2251, Internet Engineering Task Force (IETF), July 1997; more information about LDIF can be found in Good, "The LDAP Data Interchange Format (LDIF)—Technical Specification", RFC 2849, IETF, June 2000.

Submitting multiple concurrent requests from a given client could enhance the performance of loading directory entries from LDIF data. However, the need to maintain data consistency presents a significant problem. Due to the nature of the LDAP data structure, it is common for there to be dependencies among the entries expressed in the LDIF file; loading a particular entry may not make sense before a set of other entries has been successfully loaded. Perhaps due to data consistency issues, some LDAP servers serialize updates at the server and do not allow for concurrent processing of update operations; these servers are distributed with a single-threaded client utility program for adding LDIF data to a directory but are not provided with a multi-threaded utility program.

One possible solution to the consistency issue is to expand the granularity of the add operation such that adding an entire LDIF file comprises a single transaction. Since the entries are all committed at once, there is no intermediate inconsistent state in the case that elements are added out of order. However, in this transactional approach, failure in the loading of one entry causes loading of all entries in the LDIF file to be rolled back.

Therefore, it would be advantageous to have a method for loading an LDIF file to an LDAP directory in a multi-threaded fashion while preserving data consistency. It would be particularly advantageous to provide a process that commits each element from the LDIF file individually, thereby allowing processing to proceed around any element that causes an error.

SUMMARY OF THE INVENTION

A method, a system, an apparatus, and a computer program product are presented for loading LDIF ((Lightweight Directory Access Protocol (LDAP) Data Interchange Format) data into a directory. A single reader thread reads entries from an LDIF file; each entry is associated with a priority value, e.g., the priority value for an entry may be based on the number of delimiters in the distinguished name within the entry. Multiple loading threads concurrently add the entries into an LDAP directory in accordance with their associated priority values. The entries are added to the LDAP directory in an order of highest indicated priority to lowest indicated priority; entries that are associated with priority values that indicate equal priority are considered to be equivalent for the purposes of ordering the entries, so entries that have equal priority may be added to the LDAP directory in any order.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
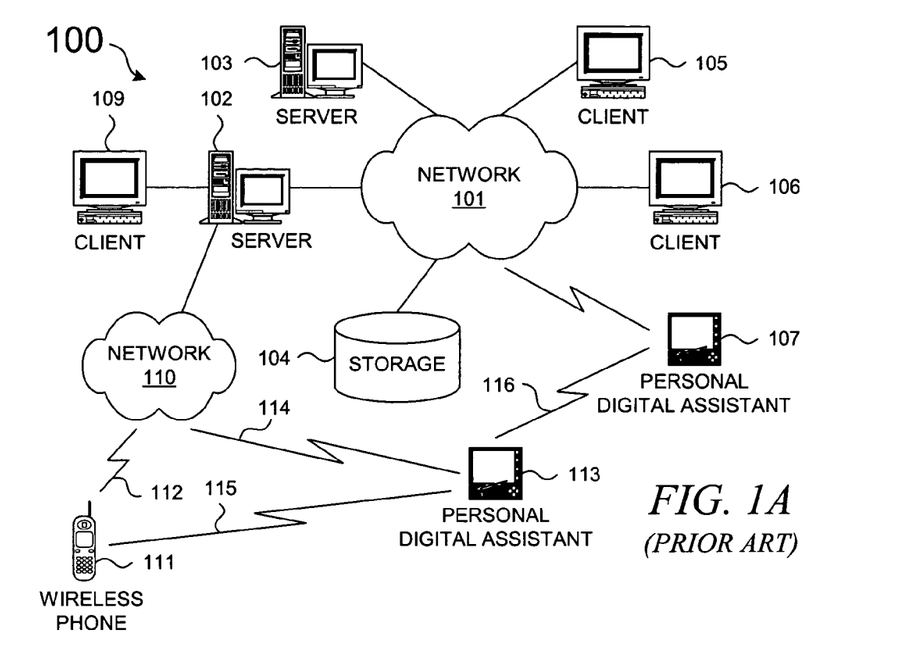
FIG. 1A depicts a typical network of data processing systems which may implement the present invention.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
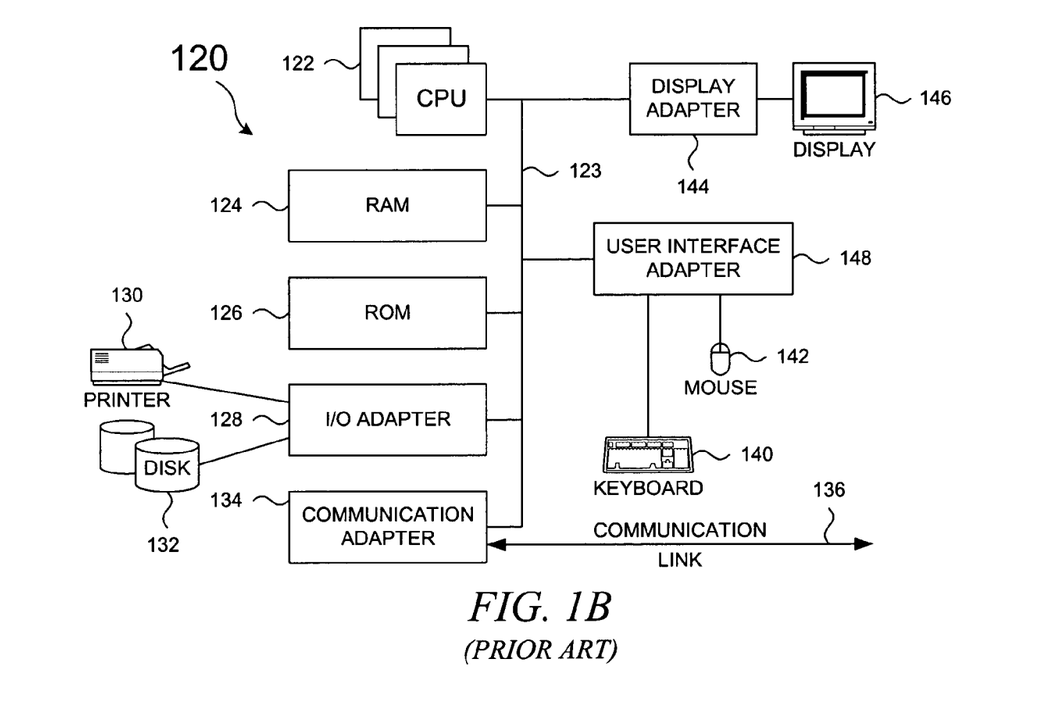
FIG. 1B depicts a typical computer architecture that may be used within a data processing system in which the present invention is implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as an audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include applications for accessing data in a variety of formats, such as graphic files, word processing files, Extensible Markup Language (XML), Hypertext Markup Language (HTML), Handheld Device Markup Language (HDML), Wireless Markup Language (WML), and LDAP Data Interchange Format (LDIF), and various other formats and types of files.

The present invention may be implemented on a variety of hardware and software platforms, as described above with respect to FIG. 1A and FIG. 1B. More specifically, though, the present invention is directed to an improved methodology for achieving enhanced performance when loading data from an LDIF file to an LDAP directory in a multi-threaded fashion. Prior to describing the improved methodology in more detail, a typical utility program for performing an LDAP add operation is described.

Figure 1C:
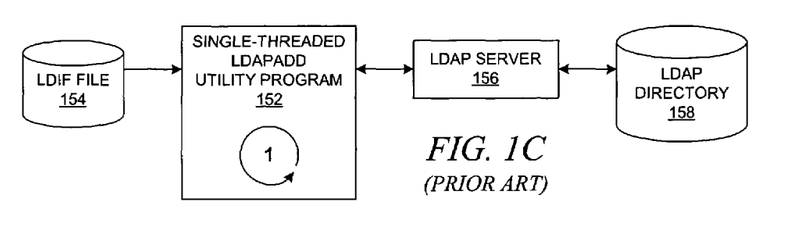
FIG. 1C depicts a block diagram that shows a typical single-threaded utility program for moving data from an LDIF file to an LDAP directory.

With reference now to FIG. 1C, a block diagram depicts a typical single-threaded utility program for moving data from an LDIF file to an LDAP directory. As mentioned above, the need to maintain data consistency can present a significant problem when attempting to add entries in an LDIF file to an LDAP directory. In a typical solution, an LDAP server is distributed with a single-threaded client utility program for adding LDIF data to a directory, such as single-threaded LDAPADD utility program 152, entitled an "LDAPADD" program due to the repeated "ldapadd" commands that it sends to an LDAP server to add entries to an LDAP directory. LDAPADD utility program 152 comprises a single-threaded process for reading entries from LDIF file 154 and sending the data to LDAP server 156 that adds the entries to LDAP directory 158.

An improperly implemented multi-threaded LDAPADD utility program might inappropriately introduce a data consistency problem in which data becomes reordered because each thread independently reads LDIF entries and independently adds the retrieved entries to the LDAP directory. Utility program 152 does not have a problem with data consistency that would be caused by an improperly implemented multi-threaded process because it does not comprise multiple threads, at least with respect to processing LDIF data.

Figure 2:
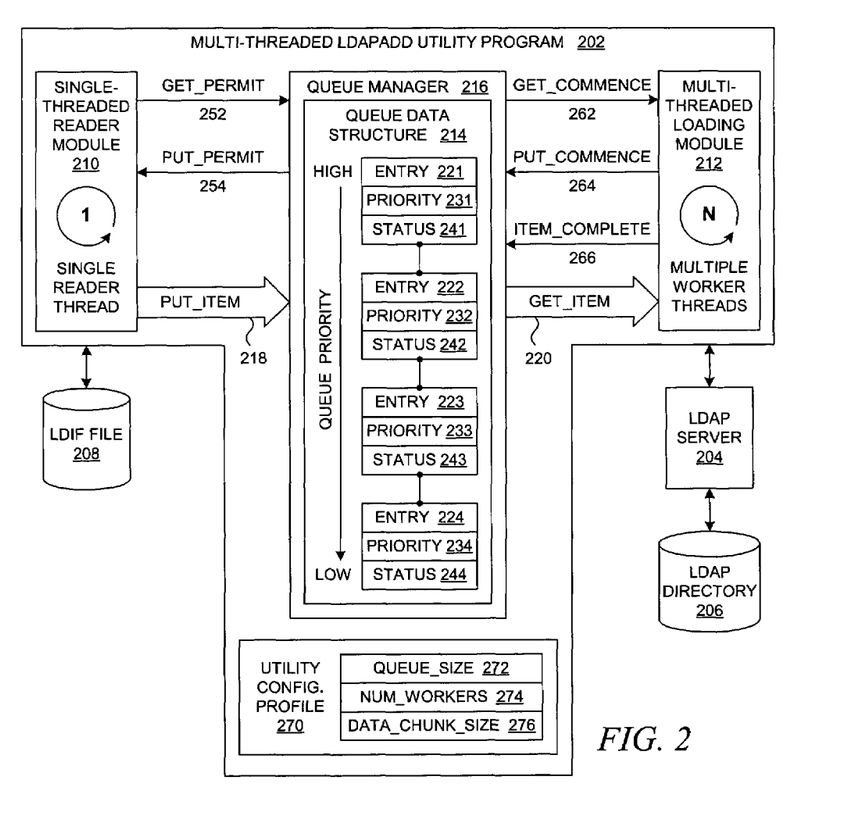
FIG. 2 depicts a block diagram that shows a multi-threaded utility program for moving data from an LDIF file to an LDAP directory in accordance with an implementation of the present invention.

With reference now to FIG. 2, a block diagram depicts a multi-threaded utility program for moving data from an LDIF file to an LDAP directory in accordance with an embodiment of the present invention. Multi-threaded LDAPADD utility program 202 that is shown in FIG. 2 is similar to single-threaded utility program 152 that is shown in FIG. 1 in that they have the same goal of loading LDIF data into an LDAP directory. Multi-threaded LDAPADD utility program 202 generates repetitive "ldapadd" commands to LDAP server 204 to add data entries to LDAP directory 206, wherein the entries have been previously read from LDIF file 208. In addition, multi-threaded LDAPADD utility program 202 maintains the consistency of the input datastream from LDIF file 208 by reading LDIF entries using a single-threaded process.

However, multi-threaded LDAPADD utility program 202 differs significantly from single-threaded utility program 152 because it separates the processing of the input datastream and the processing of the output datastream. Multi-threaded LDAPADD utility program 202 employs multiple threads in the output datastream while attempting to load the LDIF data into the LDAP directory. Multi-threaded LDAPADD utility program 202 achieves enhanced performance because it is able to attempt and complete multiple concurrent loads into the LDAP directory; the LDAP server is presented with multiple units of work concurrently so that the multiple server threads may make productive use of what would otherwise be idle time. The manner in which the present invention accomplishes these advantages is explained in more detail hereinbelow.

The separation of the processing on the input datastream and the processing on the output datastream is accomplished by controlling a single reader thread using reader module 210 and by controlling multiple loading threads using loading module 212; reader module 210 and loading module 212 comprises appropriate hardware and software for accomplishing the requisite functionality, possibly with assistance from other computational entities, such as operating system support.

After the LDIF records are read from the input LDIF file, the LDIF data is temporarily staged within queue 214 that is controlled by queue manager 216. Reader module 210 and loading module 212 are able to operate concurrently through separate interaction with interfaces to queue manager 216; reader module reads LDIF data and writes it to queue 214 using put-item operations 218 while loading module retrieves LDIF data from queue 214 using get-item operations 220 and initiates add operations to the LDAP server/directory. It should be noted that the various threads within reader module 210 and loading module 212 may be required to put information into (and to get information from) queue 214 by passing information through an application programming interface (API) supported by queue manager 216.

Queue 214 is a data structure that is described as a queue based on the manner in which queue manager 216 supports operations with respect to the data structure that are substantially first-in-first-out (FIFO) operations, which are described in more detail further below. In other words, queue 214 may be a data structure of any appropriate form that supports queue-like FIFO operations, e.g., a linked list or some other form.

Each entry in queue 214 is preferably associated with a priority value and a status value; the priority value and the status value may be contained within a constituent data structure, or the values may be stored in separate data structures that are associated with each other in some manner. FIG. 2 shows an example in which entries 221-224 are associated with priority values 231-234 and status values 241-244, respectively.

The status values may be used to track the processing phase or stage of each individual queue entry, although the amount of processing that has been performed on a particular queue entry may be tracked in a variety of manners in different embodiments of the present invention. For example, the status values in FIG. 2 may indicate at least three stages: one value may indicate that a queue entry does not contain a valid LDIF record, i.e., the queue entry is empty; one value may indicate that a queue entry contains a valid data value that has been retrieved from the LDIF file but has not yet been processed further; and one value may indicate that the data value in a queue entry has been retrieved for loading into the LDAP directory but the add/load operation to the LDAP directory has not yet completed. The queue manager, though, may have multiple auxiliary data structures that assist in the management of the queue. For example, the queue manager may maintain a data structure for each priority level, wherein the data structure for a given priority level acts as an index into the queue for indicating the set of queue entries that have an associated priority level, thereby enabling the queue manager to quickly locate queue entries that have a particular priority level.

Multi-threaded LDAPADD utility program 202 uses priority values to maintain consistency of the LDIF data in the following manner. In a standard fashion, no entry in an LDIF file depends on any other entry that follows it in the LDIF file, and no entry in the LDIF file depends on any other entry that is at the same depth in the directory hierarchy. By recognizing these standard properties of an LDIF file, the present invention is able to maintain data consistency by prioritizing LDIF entries according to their depth in the directory hierarchy. In a preferred embodiment, the number of delimiters in an entry's distinguished name is inversely related to the entry's priority value, e.g., fewer delimiters results in a higher priority, and more delimiters (a deeper position within the directory hierarchy) results in a lower priority.

Queue manager 216 employs the priority values to enforce a strict prioritization of processing of queue entries within the queue. As noted above, queue manager 216 supports substantially FIFO operations but not strictly FIFO operations; instead, queue manager 216 ensures that no entry in queue 214 may be retrieved from queue 214 before all higher priority entries are retrieved. However, queue entries that have the same associated priority value are considered to be equivalent with respect to removing them from the queue. For example, at a particular point in time, two queue entries with the same priority value may be contained in the queue; one of the queue entries would have been put into the queue prior to the other queue entry, but either queue entry may be removed without affecting the data consistency of the overall LDIF data.

It should be noted that it is possible that an LDAP add operation to the LDAP directory may fail for various reasons. In a preferred embodiment, the present invention maintains a copy of an LDIF entry in the queue until the loading of a copy of the LDIF entry is confirmed. Hence, one of ordinary skill in the art would understand that, in one embodiment, the queue entries may be removed and deleted from the queue when it is being processed, but in a preferred embodiment, the content from a queue entry is copied for processing during a get operation and then permanently removed at a subsequent point in time after it is determined that the copy of the content in the queue entry is no longer needed.

Using this prioritization scheme, a lesser number of delimiters, i.e., a higher position within the directory hierarchy, results in a higher priority. If the queue contains entries having multiple priorities, then entries with the highest priority are processed first in any order for that particular priority, followed by entries in the next lowest priority in any order for that next priority. In this manner, the consistency of the LDIF records is maintained as the data is transferred from the LDIF file to the intermediate, temporary, staging queue and then removed from the queue. The remainder of the description hereinbelow illustrates a preferred embodiment for implementing the present invention.

Queue manager 216 supports interfaces for two modes of operation: a putting mode, during which LDIF data is put into the queue, and a getting mode, during which LDIF data is gotten or retrieved from the queue. For the putting mode interface with reader module 210, queue manager 216 waits to receive a signal that indicates that queue entries may be removed from the queue, shown as "get_permit" signal 252. In addition, queue manager 216 emits to reader module 210 a signal that indicates that all queued items have been completed or processed, i.e., that all queue entries have been successfully added to the LDAP directory, shown as "put_permit" signal 254. For the getting mode interface with loading module 212, queue manager 216 emits to loading module 212 a signal that indicates that queue entries may be removed or gotten from the queue, shown as "get_commence" signal 262. In addition, queue manager 216 waits to receive from loading module 212 a signal that indicates that all queue entries have been completed or processed, i.e., that all queue entries have been successfully added to the LDAP directory, shown as "put_commence" signal 264. Queue manager 216 also accepts from loading module 212 a signal that a particular queue entry has been successfully loaded, shown as "item_complete" signal 266.

This exemplary set of signals may be used in the following manner. At some point in time, the multi-threaded LDAPADD utility program is activated to initiate an LDAP directory load operation for a particular LDIF file, e.g., via operation by a user of the utility program. When the single reader thread is activated or dispatched, e.g., by receiving "put_permit" signal 254, it reads a series of LDIF entries from the LDIF file and puts those entries into the queue. When the reader thread has completed the put mode of operation, the reader thread notifies the queue manager, e.g., by emitting "get_permit" signal 252.

The queue manager may perform some amount of intermediate processing on the queue when switching between the put mode of operation and the get mode of operation, but when the queue is ready to be emptied, the queue manager notifies the plurality of worker/loading threads, e.g., by using "get_commence" signal 262. After a worker thread has finished processing an LDIF entry, i.e., successfully loaded it into the LDAP directory, the worker thread notifies the queue manager, e.g., by using "item_complete" signal 266 in conjunction with an indicator for the particular queue entry that has been processed, such as a position number within the queue or a pointer to the queue entry that was obtained when the queue entry was retrieved by the worker thread. At some subsequent point in time, after these worker threads have emptied the queue, possibly as detected by a monitoring thread or by a load control thread that is supported by the loading module, the worker threads collectively, e.g., via the loading module, notify the queue manager that all of the queue entries have been loaded into the LDAP directory, e.g., by using "put_commence" signal 264.

It should be noted that the LDIF data may originate from a variety of sources other than a file. For example, the LDIF data may be considered by the utility program to originate from a generic input stream, such as a data pipe facility that is common in many operating systems that allow redirection of data input and data output, e.g., "stdin". It should be noted that the capabilities of the put mode of operation may also be enhanced by increasing the number of reader threads such that the LDIF data is read in a multi-threaded fashion. With enforcement of appropriate conditions on the manner in which the input datastream is processed, the consistency of the data can be maintained. As one example, two reader threads could read alternate lines from the input file, after which the lines of data are pre-processed by another thread prior to placing the LDIF entries into the queue.

Other signals may also be supported, such as a signal from the reader thread that the end of the LDIF file has been reached so as to halt the execution of the utility program. In addition, other features may be present within the utility program, such as an appropriate user interface that would allow a user to control the utility program and to obtain status messages on the progress and conclusion of the processing of data from the LDIF file. Utility configuration profile 270 may be used to contain a variety of configuration parameters that may be selected or entered by a user of the utility program to tune the performance of the utility program: queue-size parameter 272 adjusts the approximate size of the queue; number-of-worker-threads parameter 274 adjusts the approximate number of worker threads that perform the load operation; and data-chunk—size 276 adjusts the size of the chunk of LDIF data that the reader thread reads from the LDIF file before relinquishing control to change from the put mode of operation to the get mode of operation. Alternatively, these parameters can be dynamically determined by the utility program so that it adjusts automatically to the availability of resources, thereby self-tuning its performance.

It should be noted that the signaling mechanism may be implemented through a variety of means, such as software semaphores, global variables, registered callback routines, or through some other means. The manner in which these signals are generated and processed to accomplish a multi-threaded LDIF load operation into an LDAP directory while maintaining data consistency is described in more detail further below with respect to the remaining figures in accordance with a preferred embodiment of the present invention.

Figure 3:
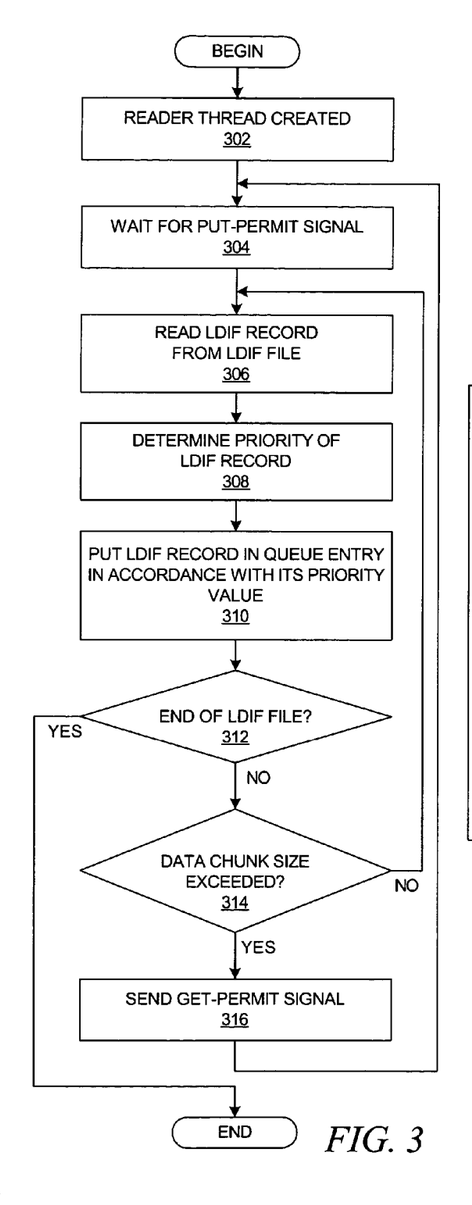
FIG. 3 depicts a flowchart that shows a process that is performed by a reader thread in a multi-threaded LDAPADD utility program.

With reference now to FIG. 3, a flowchart depicts a process that is performed by a reader thread in a multi-threaded LDAPADD utility program that has been implemented in accordance with an embodiment of the present invention. The process begins with the spawning of the reader thread (step 302) if the reader thread has not yet been created. After the reader thread has been initialized, the reader thread is suspended while it waits on the put-permit signal (step 304) from the queue manager; the reader thread is dispatched when the put-permit signal is received, and the reader thread immediately begins the put mode of operation in which LDIF data is put onto the queue.

The reader thread reads an LDIF record from the LDIF file (step 306); the reader thread reads the records from the LDIF file in a consecutive manner without requiring an initial pass through the LDIF file. The identity of the LDIF file from which to obtain data would be controlled in some manner by the utility program. The priority of the LDIF record is then determined in accordance with a predetermined algorithm (step 308), e.g., the inverse relationship between a priority value and the length of a distinguished name within the LDIF record, as described above. The LDIF record is then stored into a queue entry in accordance with its priority value (step 310); the implementation of the queue manager would govern the manner in which the reader thread passes the LDIF record and its associated priority information to the queue manager. Alternatively, the queue manager may accept the LDIF record and then determine the priority value itself.

A determination is then made as to whether or not the end of the LDIF file has been reached by the reader thread (step 312). If so, then assuming that all operations were successfully completed, the LDIF file has been loaded into the LDAP directory, and the process is concluded, after which the reader thread might be terminated.

The manner in which the life cycle of the reader thread is managed may vary. In the example embodiment that is shown in FIG. 3, an instance of the reader thread might exist only for as long as it takes to process an LDIF file; if a user operates the utility program to process another LDIF file, then another instance of the reader thread can be spawned. Alternatively, a single instance of the reader thread executes for as long as the utility program is executing.

If the end of the LDIF file has not been reached, then a determination is made as to whether a configurable data chunk size has been reached by the reader thread (step 314), and if so, then the reader thread sends a get-permit signal to the queue manager (step 316) and then suspends itself to wait on the next put-permit signal at step 304, after which the process loops through another chunk of LDIF data. Eventually, the end of the LDIF data is reached at step 312, and the process shown in FIG. 3 is concluded.

Figure 4:
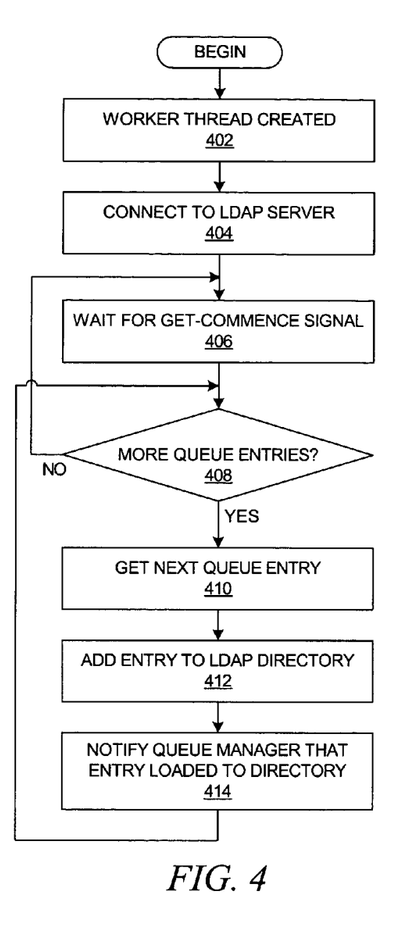
FIG. 4 depicts a flowchart that shows a process that is performed by a worker thread that loads data into an LDAP directory from within a multi-threaded LDAPADD utility program.

With reference now to FIG. 4, a flowchart depicts a process that is performed by a worker thread that loads data into an LDAP directory from within a multi-threaded LDAPADD utility program that has been implemented in accordance with an embodiment of the present invention. The process begins with the spawning of the worker thread (step 402) if the worker thread has not yet been created; multiple instances of the process that is shown in FIG. 4 would occur for each of a configurable number of worker threads. After the worker thread has been initialized, the worker thread establishes a client connection with the LDAP server to which the data from an LDIF file will be loaded (step 404), and the worker thread is suspended while it waits on a get-commence signal (step 406) from the queue manager; the worker thread is dispatched when the get-commence signal is received, and the worker thread immediately begins the get mode of operation in which LDIF data is gotten or retrieved from the queue. The manner in which the worker thread waits to commence its processing may vary; for example, rather than relying on the operating system for support in suspending and dispatching threads, the worker thread may sit in a tight execution loop while monitoring a variable whose value indicates the execution state of the worker thread.

When the worker thread is dispatched or otherwise determines that the get-mode of operation should begin, a determination is made as to whether the queue has any additional unprocessed queue entries (step 408). If not, then the worker thread returns to a wait state at step 406. The determination at step 408 may be indicated by a method call to the queue manager or in some other manner, e.g., by the value of a status variable then is returned by a method call to the queue manager when the worker thread attempts to get another queue entry from the queue. In a manner similar to that mentioned above for the reader thread, the life cycle of a worker thread may be implemented in different ways without affecting the scope of the present invention.

If the queue manager has another queue entry available, then the worker thread requests and obtains the next appropriate queue entry (step 410), and the worker thread attempts to add the LDIF entry/record to the LDAP directory (step 412). Assuming that the LDAP addition operation is successful, then the worker thread notifies the queue manager that the entry has been loaded in the directory (step 414), and the worker thread loops to step 408 in an attempt to process another queue entry. If the queue is empty at that time, then the worker thread again waits for an appropriate signal at step 406.

In this manner, a plurality of worker threads perform the process that is shown in FIG. 4 while concurrently attempting to load LDIF data into the LDAP directory. The queue manager is responsible for emitting the get-commence signal to each worker thread; alternatively, if the set of worker threads is controlled by a loading module that has some form of control thread, then the loading module may receive a single get-commence signal from the queue manager, and the loading module may be responsible for activating each worker thread. Since a plurality of worker threads collectively drain the queue, the LDIF data can be processed quickly and efficiently. Even though multiple threads are processing the LDIF data concurrently, the queue manager is responsible for returning the next appropriate queue entry in accordance with the priorities that are associated with the queue entries that remain on the queue at any given time, as explained above. By processing the queue entries in a substantially FIFO order in which the order of removal of the queue entries is determined by their associated priorities and in which any queue entry having a given priority may be removed in any order in a concurrent manner, the queue manager maintains the consistency of the LDIF data without further analysis of the queue entries.

Figure 5:
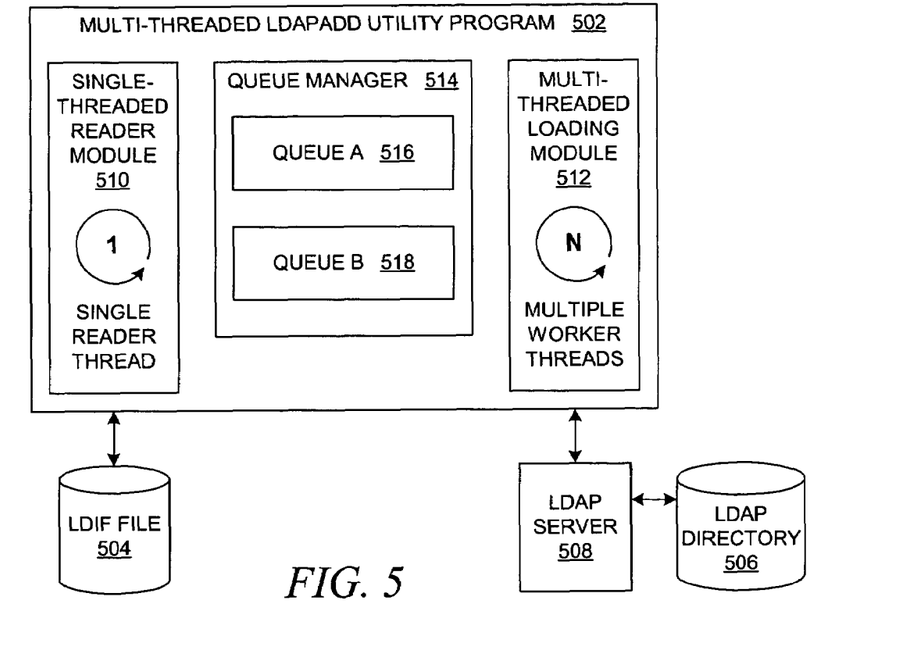
FIG. 5 depicts a block diagram that shows an alternative embodiment to the multi-threaded LDAPADD utility program that is shown in FIG. 2.

With reference now to FIG. 5, a block diagram depicts an alternative embodiment to the multi-threaded LDAPADD utility program that is shown in FIG. 2. In a manner similar to that described above with respect to FIG. 2, FIG. 5 shows an exemplary embodiment in which multi-threaded LDAPADD utility program 502 loads data entries from LDIF file 504 into LDAP directory 506 via LDAP server 508. Multi-threaded LDAPADD utility program 502 controls a single reader thread using reader module 510 and multiple loading threads using loading module 512. Queue manager 514 acts as an intermediate agent to support a staging queue that holds the LDIF data that is being processed by the reader thread and the worker threads.

In contrast to FIG. 2, FIG. 5 shows that queue manager 514 maintains two queues 516 and 518 through a type of double buffering process. Queue manager 514 ensures that each queue is exclusively either in the put mode of operation or in the get mode of operation. While the reader thread is reading data from the LDIF file and putting the LDIF data into one of the queues, the worker threads may concurrently get data from the other queue. When the reader thread and the worker threads have finished their respective processing on a particular queue, the queue manager swaps the associated modes of operation on each queue. As long as the prioritization scheme for assigning an associated priority value for each LDIF record is followed by the queue manager while putting and getting the LDIF records into the queues, the consistency of the LDIF data can be maintained. In this manner, the worker threads are not stymied by the reader thread and vice versa, thereby enhancing the speed at which the LDIF file can be loaded into the LDAP directory.

Table 1 shows a short LDIF file with five entries for illustrating a simple example of the manner in which a multi-threaded LDAPADD utility program may process an LDIF file in the manner explained with respect to FIG. 2.

TABLE 1 dn: o = bluepages
objectClass: top
objectClass: organization
o: bluepages
dn: ou = Product Development, o = bluepages
objectClass: top
objectClass: organizationalunit
ou: Product Development
dn: cn = Greta Ifill, ou = Product Development, o = bluepages
objectClass: top
objectClass: person
objectClass: organizationalPerson
objectClass: inetOrgPerson
cn: Greta Ifill
sn: Ifill
description: This is Greta Ifill's description
facsimileTelephoneNumber: +1 71 387-9510
l: San Mateo
ou: Product Development
postalAddress: bluepages$Product Development$Dept # 25
telephoneNumber: +1 71 864-3915
title: Chief Product Development Figurehead
userPassword: lliflaterG
uid: Greta_Ifill
givenName: Greta
mail: Greta_Ifill@bluepages.com
carLicense: T2TYGBB
departmentNumber: 8443
employeeType: Manager
homePhone: +1 818 117-6606
initials: G. I.
mobile: +1 804 857-3067
pager: +1 818 180-9782
manager: cn = Pulak Locicero
secretary: cn = Venkataraman Hurd
dn: cn = Hung Nehring, ou = Product Development, o = bluepages
objectClass: top
objectClass: person
objectClass: organizationalPerson
objectClass: inetOrgPerson
cn: Hung Nehring
sn: Nehring
description: This is Hung Nehring's description
facsimileTelephoneNumber: +1 804 930-6996
l: San Jose TABLE 1-continued

```
ou: Product Development
postalAddress: bluepages$Product Development$Dept # 291
telephoneNumber: +1 804 594-3030
title: Associate Product Development Accountant
userPassword: gnirheNgnu
uid: Hung_Nehring
givenName: Hung
mail: Hung_Nehring@bluepages.com
carLicense: ZB0UL1J
departmentNumber: 1687
employeeType: Temp
homePhone: +1 71 278-6297
initials: H. N.
mobile: +1 71 631-8088
pager: +1 213 531-8152
manager: cn = Mkt Silgardo
secretary: cn = Kien-Nghiep McKeage
dn: ou = Accounting, o = bluepages
objectClass: top
objectClass: organizationalunit
ou: Accounting
```

Referring to Table 1, it may be assumed that the reader thread is configured to process five entries at a given time as one chunk of data; hence, in this example, the reader thread puts the entire LDIF file into a queue in a single execution of its control loop as explained above with respect to FIG. 3. In this example, the delimiter character is ",", and the LDIF file does not present the entries in priority order. When the LDIF file is placed on the queue, a priority of zero (indicating highest priority) is assigned to the first entry from the LDIF file because the distinguished name in the first entry has zero delimiters, i.e., "dn: o=bluepages". In a similar manner, a priority of one is assigned to the second entry from the LDIF file because the distinguished name in the second entry has one delimiter, i.e., "dn: ou=Product Development, o=bluepages". A priority of two is assigned to the third and fourth entries from the LDIF file because the distinguished names in the third and fourth entries have two delimiters, i.e., "dn: cn=Greta Ifill, ou=Product Development, o=bluepages", and "dn: cn=Hung Nehring, ou=Product Development, o=bluepages", respectively. A priority of one is assigned to the fifth entry from the LDIF file because the distinguished name in the fifth entry has one delimiter, i.e., "dn: ou=Accounting, o=bluepages". The resulting queue has one entry of priority equal to zero, two entries of priority equal to one, and two entries of priority equal to two. In this example, a lower priority value is interpreted as indicating a higher priority processing status.

When the queue manager determines to enter the get mode of operation, the worker threads are activated to begin removing queue entries from the queue. Assuming that the loading module controls two worker threads, each worker thread will attempt to remove a queue entry from the queue that contains the data that is described above; each thread calls a routine in the queue manager to obtain a queue entry. However, the queue manager processes only queue entries having a given priority level concurrently; other queue entries having a lower priority level cannot be processed until all of the queue entries at the current priority level have been loaded into the LDAP directory. Because the queue only has one queue entry of priority value equal to zero, only one worker thread obtains the highest priority queue entry, which is then loaded into an LDAP directory.

In the meantime, the other worker thread must wait for the highest priority queue entry to complete its processing. The manner in which a worker thread is controlled to wait for the availability of queue data may vary. In one embodiment, if the queue is not yet empty but there are no more queue entries of a particular priority level that is currently being processed, e.g., as indicated by the status values associated with the queue entries, the queue manager may suspend execution of the other requesting worker thread until the queue manager determines that another queue entry that is associated with a next lower priority level may be processed, i.e., until the completion of processing of all queue entries having an associated priority level that matches the priority level that is currently being processed by the queue manager.

After the queue manager receives a signal that the one entry having the highest priority has been loaded into the LDAP directory, the queue manager may dispatch the other worker thread and provide it with the first entry having an associated priority value equal to the next lower priority level, i.e., one. The other worker thread will then request another queue entry, and the queue manager will provide the other worker thread with the other queue entry having an associated priority value equal to one. Hence, the two worker threads will be attempting to add an LDIF record into the LDAP directory concurrently.

Assuming that the worker threads complete the processing of their respective queue entries at substantially the same time, then each worker thread will request another queue entry, and the queue manager will provide each worker thread with a queue entry having an associated priority level equal to the next lower priority level, i.e., two. Hence, the worker threads again will be attempting to add LDIF records concurrently. In this manner, multiple worker threads executing concurrently are able to load the LDIF data into the LDAP directory more quickly.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for loading data into a directory, the method comprising:

obtaining LDIF (Lightweight Directory Access Protocol (LDAP) Data Interchange Format) entries;

associating a priority value with each LDIF entry,
wherein the priority value is determined based on a number of delimiters in the LDIF entry, and
wherein the entries having a higher number of delimiters are assigned a lower priority and entries having a lower number of delimiters are assigned a higher priority value;

adding the LDIF entries into an LDAP directory in accordance with their associated priority values using multiple loading threads,
wherein the LDIF entries are added to the LDAP directory in an order of highest indicated priority to lowest indicated priority,
wherein the LDIF entries that are associated with priority values indicating equal priority being a subset of LDIF entries,
wherein the LDIF entries from the subset of entries may be added in any order,
wherein the priority value for an LDIF entry is based on the number of delimiters in a distinguished name within an LDIF entry,
wherein multiple reader threads obtain the entries from a data source, and
wherein the LDIF entries are not presented in priority order while the LDIF entries are being obtained;

obtaining the LDIF entries in a consecutive manner without performing an initial pass through the data source;

storing the LDIF entries and their associated priority values into a data structure;

retrieving the LDIF entries from the data structure prior to adding the LDIF entries to the LDAP directory,
wherein the LDIF entries are retrieved in an order based on the priority values associated with the LDIF entries,
wherein LDIF entries are retrieved from the data structure in an order of highest indicated priority to lowest indicated priority,
wherein the LDIF entries from the subset of LDIF entries may be retrieved in any order;

employing a single reader thread from the multiple reader threads to read LDIF entries from a data source and put the LDIF entries into the data structure;

employing the multiple loading threads to get LDIF entries from the data structure and add the LDIF entries to the LDAP directory;

managing the data structure using a data structure manager, the single reader thread and the multiple loading threads interfacing with the data structure manager to put and get LDIF entries to and from the data structure;

switching between a getting mode of operation in which the reader thread is executing and a putting mode of operation in which the multiple loading threads are executing and a putting mode of operation in which the multiple loading threads are executing so that either the reader thread is executing or the multiple loading threads are executing.

2. A method for loading data into a directory, the method comprising:

obtaining LDIF (Lightweight Directory Access Protocol (LDAP) Data Interchange Format) entries;

associating a priority value with each LDIF entry,
wherein the priority value is determined based on a number of delimiters in the LDIF entry, and
wherein the entries having a higher number of delimiters are assigned a lower priority and entries having a lower number of delimiters are assigned a higher priority value;

adding the LDIF entries into an LDAP directory in accordance with their associated priority values using multiple loading threads,
wherein the LDIF entries are added to the LDAP directory in an order of highest indicated priority to lowest indicated priority,
wherein the LDIF entries that are associated with priority values indicate equal priority being a subset of LDIF entries,
wherein the LDIF entries from the subset of entries may be added in any order,
wherein the priority value for an LDIF entry is based on the number of delimiters in a distinguished name within an LDIF entry,
wherein multiple reader threads obtain the entries from a data source, and
wherein the LDIF entries are not presented in priority order while the LDIF entries are being obtained;

obtaining the LDIF entries in a consecutive manner without performing an initial pass through the data source;

storing the LDIF entries and their associated priority values into a data structure;

retrieving the LDIF entries from the data structure prior to adding the LDIF entries to the LDAP directory,
wherein the LDIF entries are retrieved in an order based on the priority values associated with the LDIF entries,
wherein LDIF entries are retrieved from the data structure in an order of highest indicated priority to lowest indicated priority,
wherein the LDIF entries from the subset of LDIF entries may be retrieved in any order;

employing a single reader thread from the multiple reader threads to read LDIF entries from a data source and put the LDIF entries into the data structure;

employing the multiple loading threads to get LDIF entries from the data structure and add the LDIF entries to the LDAP directory;

managing the data structure using a data structure manager, the single reader thread and the multiple loading threads interfacing with the data structure manager to put and get LDIF entries to and from the data structure; and providing a pair of double buffers such that the reader thread operates with respect to a first double buffer while concurrently the multiple load threads operate with respect to a second double buffer.

* * * * *